US012066106B2

(12) United States Patent
Brushkivskyy et al.

(10) Patent No.: US 12,066,106 B2
(45) Date of Patent: Aug. 20, 2024

(54) SEAL DEVICE, ELECTRIC MACHINE, AND DRIVE DEVICE

(71) Applicant: ZF Friedrichshafen AG, Friedrichshafen (DE)

(72) Inventors: Vyacheslav Brushkivskyy, Kressbronn am Bodensee (DE); Gerhard Höring, Hagnau am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 141 days.

(21) Appl. No.: 17/293,210

(22) PCT Filed: Oct. 14, 2019

(86) PCT No.: PCT/EP2019/077679
§ 371 (c)(1),
(2) Date: May 12, 2021

(87) PCT Pub. No.: WO2020/104109
PCT Pub. Date: May 28, 2020

(65) Prior Publication Data
US 2022/0003318 A1 Jan. 6, 2022

(30) Foreign Application Priority Data
Nov. 19, 2018 (DE) ..................... 10 2018 219 781.4

(51) Int. Cl.
*F16J 15/16* (2006.01)
*F16C 33/66* (2006.01)
(Continued)

(52) U.S. Cl.
CPC ......... *F16J 15/164* (2013.01); *F16C 33/6685* (2013.01); *F16C 33/7886* (2013.01);
(Continued)

(58) Field of Classification Search
CPC .... F16J 15/164; F16J 15/3204; F16J 15/3216; F16J 15/3284; F16J 15/3288;
(Continued)

(56) References Cited

U.S. PATENT DOCUMENTS 3,476,395 A 11/1969 Cornelius
4,380,416 A * 4/1983 Menager ............... F04D 29/126 415/174.3
(Continued)

FOREIGN PATENT DOCUMENTS

DE 25 40 010 A1 3/1977
DE 34 26 705 A1 1/1986
(Continued)

OTHER PUBLICATIONS

German Search Report Corresponding to 10 2018 219 781.4 mailed Oct. 10, 2019.
(Continued)

*Primary Examiner* — Gilbert Y Lee
(74) *Attorney, Agent, or Firm* — Finch & Maloney PLLC

(57) ABSTRACT

A seal device (3) for a rotating shaft (1). The seal device has a shaft seal (4) and a collecting device (5) for the contactless removal of leakage, that penetrates through the shaft seal (4), from the shaft (1). Further, an electric machine has a rotor shaft (1) that can be driven in rotation and a seal device (3) of the type for sealing the rotor shaft (1) and, therefore, also an inside space of the electric machine. Additionally, a drive device for the electrical driving of a motor vehicle that has an electric machine of the type for the provision of a drive power of the drive device.

9 Claims, 1 Drawing Sheet

(51) Int. Cl.

| | |
|---|---|
| ***F16C 33/78*** | (2006.01) |
| ***F16J 15/3204*** | (2016.01) |
| ***H02K 5/10*** | (2006.01) |
| ***H02K 7/00*** | (2006.01) |
| ***H02K 11/40*** | (2016.01) |
| *B60K 1/00* | (2006.01) |

(52) U.S. Cl.

CPC ............ *F16J 15/3204* (2013.01); *H02K 5/10* (2013.01); *H02K 7/003* (2013.01); *H02K 11/40* (2016.01); *B60K 1/00* (2013.01)

(58) Field of Classification Search

CPC .......... H02K 11/40; H02K 5/10; H02K 7/003; F16C 33/6685; F16C 33/7886; B60K 1/00

See application file for complete search history.

(56) References Cited

U.S. PATENT DOCUMENTS

| | | | | |
|---|---|---|---|---|
| 4,619,458 | A | 10/1986 | Mitumaru | |
| 4,992,023 | A | 2/1991 | Baker et al. | |
| 9,010,100 | B2 * | 4/2015 | Walker | F16D 33/00 60/330 |
| 2011/0062818 | A1 | 3/2011 | Oh et al. | |
| 2013/0075975 | A1 * | 3/2013 | Hilaris | F04C 15/0003 277/350 |
| 2013/0283774 | A1 | 10/2013 | Walker et al. | |

FOREIGN PATENT DOCUMENTS

| | | | |
|---|---|---|---|
| DE | 10 2016 207 672 | A1 | 11/2017 |
| EP | 0735274 | B1 * | 12/2000 |
| GB | 2 140 102 | A | 11/1984 |
| JP | S58-106266 | A | 6/1983 |

OTHER PUBLICATIONS

International Search Report Corresponding to PCT/EP2019/077679 mailed Jan. 28, 2020.

Written Opinion Corresponding to PCT/EP2019/077679 mailed Jan. 28, 2020.

Chinese Office Action Corresponding to 201980075913.0 issued Dec. 5, 2022.

Chinese Office Action Corresponding to 201980075913.0 issued Jul. 29, 2023.

* cited by examiner

SEAL DEVICE, ELECTRIC MACHINE, AND DRIVE DEVICE

This application is a National Stage completion of PCT/EP2019/077679 filed Oct. 14, 2019, which claims priority from German patent application Ser. No. 10 2018 219 781.4 filed Nov. 19, 2018.

FIELD OF THE INVENTION

The invention relates on the one hand to a seal device for a rotating shaft, and to an electric machine with a seal device, and to a drive device for electrically driving a motor vehicle, comprising an electric machine of this type.

BACKGROUND OF THE INVENTION

Seal devices for shafts are known as such, for example radial shaft seals or labyrinth seals. They prevent the escape of a gaseous or liquid fluid such as a lubricant in the area of the shaft.

From DE 10 2016 207 672 A1 a sealing system for a shaft is known, in which, besides the actual shaft seal, a shaft grounding ring is provided. An embodiment of that system comprises two shaft seals between which the shaft grounding ring is arranged.

SUMMARY OF THE INVENTION

The purpose of the present invention is to develop the prior art further.

This objective is achieved by the characteristics specified in the principal claim. Preferred embodiments emerge from the subordinate claims.

Accordingly, as explained at the outset, a sealing device for a rotatable shaft, having a shaft seal, is proposed. In addition an electric machine with a rotor shaft that can be driven in rotation, having a seal of that type for sealing the rotor shaft and thereby also sealing an inside space of the electric machine, is proposed. Furthermore, a drive device for electrically driving a motor vehicle is proposed, which comprises an electric machine of the type for the provision of drive power for driving a motor vehicle. Such an electric machine converts electrical energy into a mechanical rotation movement, or conversely. As necessary, such an electric machine can be operated as an electric generator or as a motor. The electric machine is in particular a synchronous machine or an asynchronous machine.

The seal device proposed serves to seal the rotating shaft. For this, it comprises a shaft seal. It also comprises a collecting device for the contactless removal of any leakage that makes its way from the shaft through the shaft seal. In addition therefore, besides the shaft seal the collecting device is provided. This works in a contactless manner. Thus, no additional sealing lip, brushes or other components in contact with the shaft and therefore performing frictional work are needed in order to wipe away leakage from the shaft. Such a collecting device works virtually without wear and without frictional losses. The surroundings downstream from the seal device are thereby kept largely free from leakage.

In this connection, leakage that passes through the shaft seal means in particular a volume flow of a fluid, which although it is basically intended to be held back by the shaft seal, nevertheless undesirably gets through the shaft seal for various reasons. For example, a leak of that kind occurs when there is a large enough gap between the shaft seal and the shaft itself, so that the fluid can flow through there along the shaft. Such a fluid can in particular be a liquid. Such a fluid can in particular be a lubricant. However, depending on the intended purpose of the seal device it can also be some other fluid, such as a coolant.

In particular, a shaft seal is understood to mean a structural element intended to hold back the fluid in the area of the shaft. Such shaft seals are already known in themselves, for example in the form of radial shaft seals or labyrinth seals.

The collecting device works in particular by producing a centrifugal force that acts upon the leaking fluid. This occurs when the shaft is rotating. A local enlargement of the diameter (thickening) of the shaft, provided for the collecting device, causes the leak to move radially outward due to the rotation of the shaft. This takes place to an extent such that due to the centrifugal force produced the leak fluid is flung off the shaft and caught and led away by the rest of the collecting device. Alternatively or in addition to this, it is possible to draw off the leak fluid from the shaft by virtue of the generation of an underpressure at the collecting device.

The collecting device can itself constitute a reservoir for collecting the leak fluid captured and led away. Or else, the collecting device can lead (directly) into such a reservoir for the leak fluid, or at least it can lead into a pipe which passes the leak fluid on into such a reservoir.

Preferably, the collecting device is formed by a shoulder arranged on the shaft and a collecting structure that surrounds the shoulder radially. Such a shoulder is on the one hand a local thickening of the shaft and on the other hand it forms a breakaway edge for the leak fluid. Thus, already at a relatively low rotational speed of the shaft the leak fluid is detached from and flung off the shaft. The shoulder is in this case provided for withdrawing the leakage from the shaft, while the collecting structure is provided for the actual capture and removal of the leakage withdrawn by virtue of the shoulder. The breakaway edge can have a suitable shape so that the leakage is withdrawn particularly effectively from it. In particular, the breakaway edge can be sharp-edged or burred (i.e. having burrs).

The shoulder arranged on the shaft can be in the form either of a shoulder of the shaft itself, or of a component fixed onto the shaft and surrounding it radially. Such a shaft shoulder can be formed by the shaft itself, i.e. by appropriate shaping of the shaft itself for example during a machine turning process. A component that surround the shaft radially can be for example a separate ring press-fitted onto the shaft or fixed thereto in some other way. The component then forms the thickened area on the shaft, with the breakaway edge. In that way, in a simple and inexpensive manner the part of the collecting device which withdraws the leak fluid from the shaft can be produced.

Preferably, the collecting structure that surrounds the shaft radially is formed by a housing that encloses the shaft and in which the shaft can rotate. Thus, such a housing comprises at least one bearing by virtue of which the shaft is rotatably mounted. The collecting structure can for example be a special cast structure in the housing, which is formed when the housing is produced by casting. Alternatively, the collecting structure can also be designed to be fixed on the housing, for example by screwing, welding, press-fitting or adhesive bonding. In the latter case the actual housing and the collecting structure are different components. The collecting structure is preferably made of sheet metal or plastic. In that way it can be produced particularly simply and inexpensively.

Preferably, in a radially inner area the collecting structure is bent over in such manner that a radially inner end of the collecting structure is pot-shaped and directed toward the shaft shoulder. This prevents leakage flung upward, which then runs down the collecting structure in the direction of the shaft, from dripping back down onto the shaft. Instead, that portion of the leakage is led by the pot shape of the collecting structure along and around the shaft.

Preferably, the seal device comprises a shaft grounding connection. A shaft grounding connection of this type is in particular understood to be a structural element which forms a rotatable electric connection between the shaft and an electric reference potential. Such a reference potential is for example an electrical ground potential or an electrical 'ground'. Such a shaft grounding connection does not serve for electrical commutation. Preferably, the shaft grounding connection connects the shaft electrically to the aforesaid housing. In particular, the shaft grounding connection comprises at least one solid or flexible brush for making sliding contact with the shaft. In particular, the shaft grounding connection is in the form of a shaft grounding ring.

Preferably, the shaft seal, the shaft grounding connection and the collecting device are arranged axially one behind another. Here, the axial direction is understood to be the direction along the rotational axis of the shaft. In this case the shaft grounding connection can be positioned between the shaft seal and the collecting device. In that way the collecting device can also capture any possible mechanical wear particles from the shaft grounding connection. As a rule, such wear particles come from the brush or brushes of the shaft grounding connection. Alternatively, the collecting device can be arranged axially between the shaft seal and the shaft grounding connection. In that way the shaft grounding connection is positioned on the other side of the shaft seal and the collecting device, and thus does not come into contact with the leakage, or only hardly at all so.

It can be provided that the shaft grounding connection is arranged on the collecting structure. The shaft grounding connection is then also carried by the collecting structure. In that way the shaft in the area of the collecting structure is electrically connected to the electrical reference potential. Thus, the collecting structure itself can be part of the electrical connection between the shaft and the reference potential. Accordingly, the collecting structure and the shaft ground connection can form a conjointly fitted unit.

The breakaway edge of the shaft shoulder can be arranged axially between the shaft seal and the shaft grounding connection. This prevents the leakage coming from the shaft seal from reaching the shaft grounding connection. That can also be done when the shaft grounding connection is arranged on the collecting structure.

The proposed electric machine has a rotor shaft that can be driven in rotation. The rotor shaft is in particular connected to a rotor of the electric machine, which also includes the case when the rotor and the rotor shaft are made integrally, as one piece. The rotor and thus also the rotor axis can rotate in particular by virtue of a stator fixed to the housing. The electric machine has a seal device for sealing the rotor shaft. The seal device of the electric machine is in the form of the proposed seal device. Thus, in a simple manner any leakage into the inside (interior space) of the electric machine from the rotor shaft can be led away and collected.

Preferably, the electric machine has an inside space in which the rotor connected to the rotor shaft is rotatably arranged. The rotor shaft then projects out of the inside space at the seal device. The seal device seals the inside space of the electric machine against the rotor shaft relative to the outside. The collecting device and, when present, the shaft grounding connection of the seal device are here arranged within the inside space of the electric machine, in particular close to the shaft seal. This prevents any fluid from the outside from making its way into the inside space of the electric machine and distributing itself there in an uncontrolled manner. At the same time, the shaft can thereby be electrically connected to the electric reference potential.

The proposed drive device serves for electrically driving a motor vehicle. Accordingly, the drive device comprises an electric machine for the provision of drive power for the motor vehicle. The drive device can in particular be in the form of a drive module and can for example be designed to be arranged on a driven axle of the motor vehicle. The electric machine of the drive device is in the form of the proposed electric machine, and therefore comprises the proposed seal device.

BRIEF DESCRIPTION OF THE DRAWINGS

Below, the invention is explained in greater detail with reference to figures from which further preferred embodiments and features of the invention emerge. In each case schematically, the figures show.

DETAILED DESCRIPTION OF THE PREFERRED EMBODIMENTS

In the figures, the same or at least functionally equivalent components or elements are denoted by the same indexes.

Figure 1:
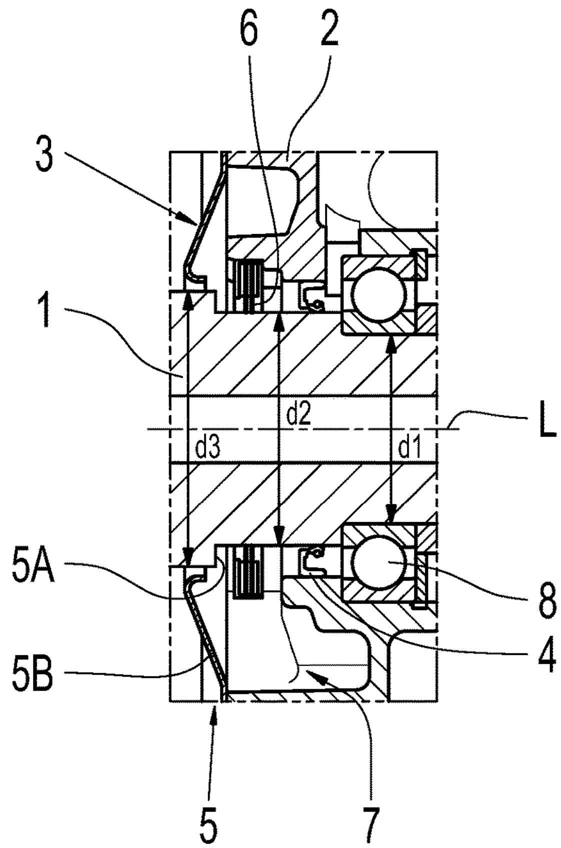
FIG. 1: A partial view of a longitudinal section through an electric machine in the area of a seal device.

FIG. 1 shows part of a longitudinal section through an electric machine in the area of an axial end of the electric machine. In this area a rotor shaft 1 of the electric machine that can rotate about the rotational axis L passes through a housing 2 of the electric machine. To seal an inside space of the electric machine in the area of the shaft 1, a seal device 3 is provided. The seal device 3 comprises a shaft seal 4, here for example a radial shaft seal, and a collecting device 5 axially a distance away from it, and a shaft grounding connection 6, here for example a shaft grounding ring. In FIG. 1 the inside space of the electric machine is to the left of the shaft seal 4.

The shaft seal 4 is intended to prevent the ingress of a fluid, in particular a lubricant, into the inside space of the electric machine. In practice this does not occur under all operating conditions of the electric machine. However, it can happen that a leak penetrates the shaft seal 4 and flows along the shaft 1 into the inside space of the electric machine. This is prevented by the collecting device 5, which can therefore also be called a leakage collecting device. In the example embodiment shown, the collecting device 5 consists of a shaft shoulder 5A on the shaft 1 and a collecting structure 5B fixed to the housing 2. The collecting structure 5B surrounds the shoulder 5A but is not in contact with it. Thus, the collecting structure 5B works in a contactless manner. The collecting structure 5B shown is made, for example, of sheet metal or plastic. The shoulder 5A forms a breakaway edge for the leakage that passes through the shaft seal 4.

When the shaft 1 rotates about the rotational axis L and during this a leak occurs through the shaft seal 4, this reaches the shoulder 5A. There, it is guided along the shoulder 5A radially outward to the breakaway edge of the shoulder 5A.

The breakaway edge in combination with the centrifugal force acting of the leakage at that point causes the leakage to be withdrawn and flung outward from the shoulder 5A. The outward-flung leakage is captured by the structure 5B and passed into a reservoir 7 located under the shaft seal 4. In the example embodiment shown the reservoir 7 is formed by the housing 2. Alternatively, the reservoir 7 can be formed by the collecting structure 5B itself.

In the radially inner area (i.e. in the area close to the shaft 1), the collecting structure 5B has a bent portion so that the radially inner end of the collecting structure 5B is pot-shaped and extends parallel to the shaft 1 toward the shoulder 5A. Leakage flung upward and is caught there by collecting structure 5B and then flows along the collecting structure 5B and the pot shape into the reservoir 7, without dripping back onto the shaft 1. As can be seen in FIG. 1, the collecting structure 5B can otherwise be saucer-shaped.

The shaft grounding connection 6 serves for the permanent electrical connection of the shaft 1 to the housing 2 as the electrical reference potential. In that way, bearings 8 for mounting the shaft 1 in the housing 2 are protected against damage that can occur at the bearings 8 by virtue of electrical potential differences.

The shaft grounding connection 6 is arranged axially, relative to a rotational axis L, between the collecting device 5 and the shaft seal 4. These elements 4, 5 and 6 are directly adjacent to one another. However, otherwise than this the collecting device 5 can also be arranged axially between the shaft grounding connection 6 and the shaft seal 4.

Axially adjacent to the shaft seal 4 and outside the inside space of the electric machine is located the bearing 8 for the rotatable mounting of the shaft 1 in the housing 2, in this case for example in the form of a deep-groove ball bearing. The bearing 8 is arranged on a first diameter d1 of the shaft 1. The shaft seal 4 and the shaft grounding connection 6 are arranged on another, second diameter d2 of the shaft 1. The shoulder 5A forms another, third diameter d3 of the shaft 1. In this case d1<d2<d3.

Figure 2:
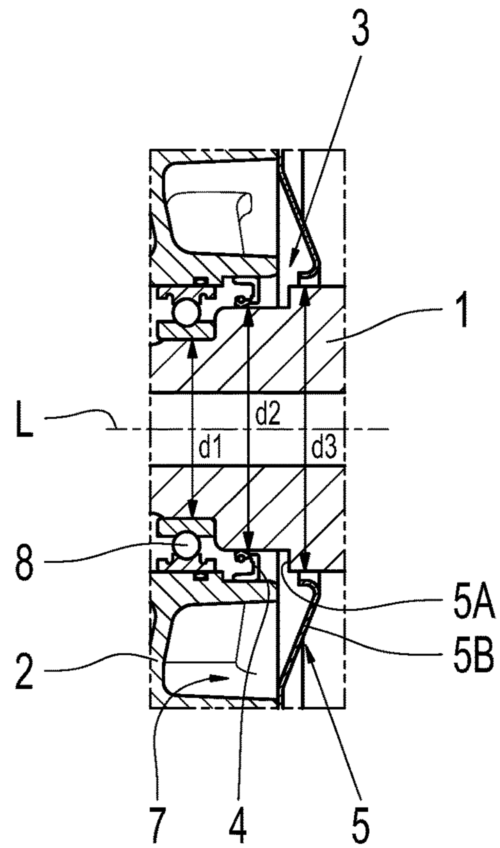
FIG. 2: A partial view of a longitudinal section through an electric machine in the area of a seal device.

FIG. 2 shows an embodiment of a seal device 3 which is slightly different compared with that of FIG. 1. The essential difference is that in the embodiment according to FIG. 2 no grounding connection 6 is provided. In other respects the explanations concerning the embodiment according to FIG. 1 also apply to the embodiment according to FIG. 2. In this case the inside space of the electric machine is to the right side of the shaft seal 4.

It can be provided that the seal device 3 according to FIG. 1 is arranged so as to seal the shaft 1 on a first side of an electric machine and the seal device 3 according to FIG. 2 is arranged on a second side of the electric machine opposite the first side in order to seal the shaft 1 there. A rotor of the electric machine connected to the shaft 1 is then arranged in particular axially adjacent to and between the two collecting structures 5B in FIGS. 1 and 2.

INDEXES

1 Rotor shaft, shaft
2 Housing
3 Seal device
4 Shaft seal
5 Collecting device
5A Shaft shoulder
5B Collecting structure
6 Shaft grounding connection
7 Reservoir
8 Bearing
d1 Shaft diameter
d2 Shaft diameter
d3 Shaft diameter
L Rotation axis

The invention claimed is:

1. An electric machine with a seal device (3) for sealing a rotatable rotor shaft and comprising:

a shaft seal that abuts the rotor shaft, wherein along a rotational axis of the rotor shaft the shaft seal seals an inside space of the electric machine from an outside of the electric machine, and a housing of the electrical machine has a bearing which rotatably supports the rotor shaft, the bearing being axially arranged on the outside of the electric machine, a collecting device for the removal of leakage fluid, that penetrates through the shaft seal in a downstream direction, from the rotor shaft, the collecting device is formed by a shoulder on the rotor shaft and a collecting structure that radially surrounds the shoulder, the collecting structure is spaced from the shoulder by a radial gap such that the collecting structure is free of contact with the shoulder and the rotor shaft, a shaft electrical grounding connection, wherein the collecting device and the shaft electrical grounding connection are axially located in the inside space of the electric machine.

2. The electric machine with the seal device according to claim 1, wherein the shoulder is formed by a shoulder of the shaft itself, or by a component that is fixed to and radially surrounds the rotor shaft.

3. The electric machine with the seal device according to claim 1, wherein the collecting structure is formed by the housing in which the rotor shaft is rotatably mounted, or the collecting structure is fixed the housing in which the shaft is rotatably mounted.

4. The electric machine with the seal device according to claim 1, wherein the collecting structure is made from one of sheet metal or plastic.

5. The electric machine with the seal device according to claim 1, wherein the shaft seal, the shaft electrical grounding connection and the collecting device are axially arranged in the downstream direction one behind another, the downstream direction being an axial direction from the outside of the electrical machine to the inside space of the electrical machine.

6. The electric machine with the seal device according to claim 5, wherein an entirety of the shaft electrical grounding connection is arranged axially between the shaft seal and the collecting device.

7. The electric machine with the seal device according to claim 5, wherein the collecting device is arranged axially between the shaft seal and the shaft electrical grounding connection.

8. The electric machine with the seal device according to claim 1, wherein the shaft electrical grounding connection is arranged on the collecting structure.

9. A drive device for electrically driving a motor vehicle, comprising an electric machine for provision of a drive power of the drive device, wherein the electric machine is formed according to claim 1.

* * * * *